United States Patent
Chang

(10) Patent No.: US 9,035,816 B2
(45) Date of Patent: *May 19, 2015

(54) RFID TRANSMITTER FOR REMOTE CONTROL

(71) Applicant: FAVEPC Inc., Chu-Pei, Hsin-Chu County (TW)

(72) Inventor: Shao-Chang Chang, Chu-Pei (TW)

(73) Assignee: FAVEPC INC., Chu-Pei, Hsin-Chu County (TW)

( * ) Notice: Subject to any disclaimer, the term of this patent is extended or adjusted under 35 U.S.C. 154(b) by 206 days.

This patent is subject to a terminal disclaimer.

(21) Appl. No.: 13/793,272

(22) Filed: Mar. 11, 2013

(65) Prior Publication Data

US 2014/0254327 A1  Sep. 11, 2014

(51) Int. Cl.
*H04L 17/02* (2006.01)
*H04B 1/20* (2006.01)

(52) U.S. Cl.
CPC .................................. *H04B 1/202* (2013.01)

(58) Field of Classification Search
None
See application file for complete search history.

(56) References Cited

U.S. PATENT DOCUMENTS

| | | | |
|---|---|---|---|
| 2005/0008168 A1* | 1/2005 | Pompei | 381/77 |
| 2014/0253360 A1* | 9/2014 | Chang | 341/176 |
| 2014/0254326 A1* | 9/2014 | Chang | 367/197 |
| 2014/0254803 A1* | 9/2014 | Chang | 381/28 |

* cited by examiner

*Primary Examiner* — Travis Hunnings
(74) *Attorney, Agent, or Firm* — Muncy, Geissler, Olds & Lowe, P.C.

(57) ABSTRACT

A transmitter for remote control, the transmitter includes an amplifier configured to receive a first audio signal from an electronic device and amplify the first audio signal, a transmission module electrically connected to the amplifier to receive the amplified first audio signal and generating a carrier signal, a power supply connected to the transmission module, and an attenuation circuit electrically connected to the transmission module to receive the carrier signal, wherein the amplified first audio signal is configured to modulate the carrier signal and the first audio signal is one of a left channel audio signal and a right channel audio signal output from the electronic device via an audio connector.

20 Claims, 3 Drawing Sheets

RFID TRANSMITTER FOR REMOTE CONTROL

BACKGROUND OF THE INVENTION

The present invention generally relates to a transmitter and, more particularly, to a radio frequency identification (RFID) transmitter having a range-variable antenna matching function for remote control.

RFID technology has been widely used various products such as be used to remotely control various consumer electronic products, for example, stereo systems, digital video disc (DVD) players and game consoles, etc. An RFID control may have to verify an electronic product via antenna matching to establish a communication channel. However, an RFID remote control may sometimes inevitably match unintended electronic products. FIG. 1 is a schematic diagram illustrating an RFID remote control and a plurality of electronic devices. Referring to FIG. 1, electronic devices 21, 22, 23, 24 and 25 may be located at different distances from the RFID remote control 1. The transmitter (not shown) resided in the RFID remote control 1 may have enough emitting power so that each the electronic devices 21, 22, 23, 24 and 25 may be able to receive RF signals from the RFID remote control 1. Accordingly, not only the target electronic device, for example, product 23 but the other devices 21, 22, 24 and 25 may receive the RF signal.

It may therefore be desirable to have a remote control which is equipped with a range-variable transmitter to achieve the antenna matching with the target device.

BRIEF SUMMARY OF THE INVENTION

Examples of the present invention may provide a transmitter for remote control, the transmitter includes an amplifier configured to receive a first audio signal from an electronic device and amplify the first audio signal; a transmission module electrically connected to the amplifier to receive the amplified first audio signal and generate a carrier signal; a power supply connected to the transmission module; and an attenuation circuit electrically connected to the transmission module to receive the carrier signal, wherein the amplified first audio signal is configured to modulate the carrier signal and the first audio signal is one of a left channel audio signal and a right channel audio signal output from the electronic device through an audio connector.

Some examples of the present invention may provide a transmitter for remote control, the transmitter includes an amplifier configured to receive a first audio signal from an electronic device and amplify the first audio signal; a transmission module electrically connected to the amplifier to receive the amplified first audio signal and generate a carrier signal; a power supply connected to the transmission module; an attenuation circuit electrically connected to the transmission module to receive the carrier signal and output an attenuated carrier signal; and an analog-to-digital converter connected to the attenuation circuit, wherein the amplified first audio signal is configured to modulate the carrier signal, and the analog-to-digital converter is configured to receive a second audio signal from the electronic device and generate an digital signal to activate the attenuation circuit.

Some examples of the present invention may provide a transmitter for remote control, the transmitter includes an amplifier configured to receive a first audio signal from a first electronic device and amplify the first audio signal; a transmission module electrically connected to the amplifier to receive the amplified first audio signal and generate a carrier signal; an attenuation circuit electrically connected to the transmission module to receive the carrier signal and output an attenuated carrier signal; a receiver module electrically connected to the first electronic device; and a power supply respectively connected to the transmission module and the receiver module, wherein the amplified first audio signal is configured to modulate the carrier signal.

Additional features and advantages of the present invention will be set forth in part in the description which follows, and in part will be obvious from the description, or may be learned by practice of the invention. The features and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings examples which are presently preferred. It should be understood, however, that the invention is not limited to the precise arrangements and instrumentalities shown.

In the drawings.

DETAILED DESCRIPTION OF THE INVENTION

Reference will now be made in detail to the present examples of the invention, examples of which are illustrated in the accompanying drawings. Wherever possible, the same reference numbers will be used throughout the drawings to refer to the same or like parts.

Figure 1:
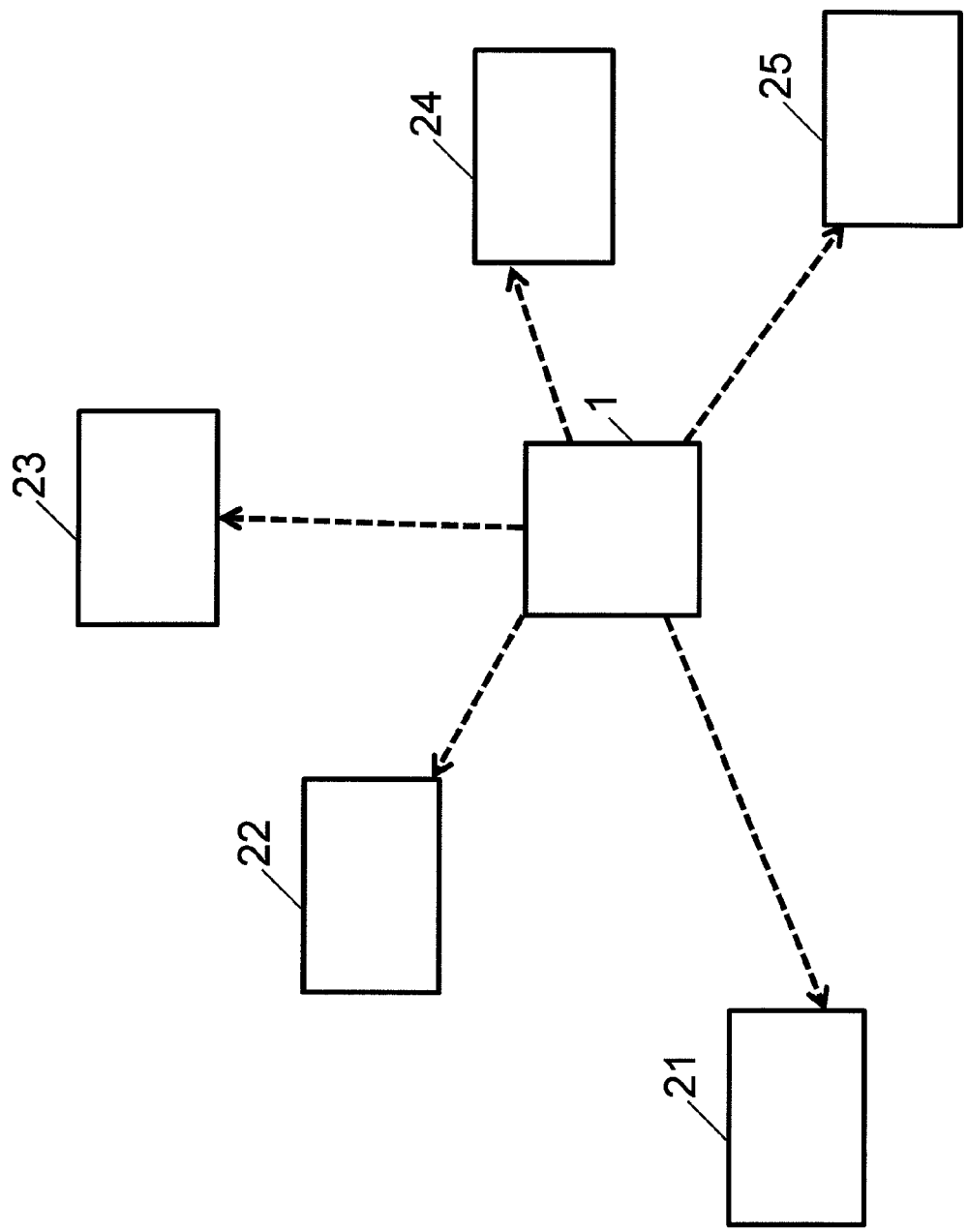
FIG. 1 is a schematic diagram illustrating an RFID remote control and a plurality of electronic devices.
Figure 2:
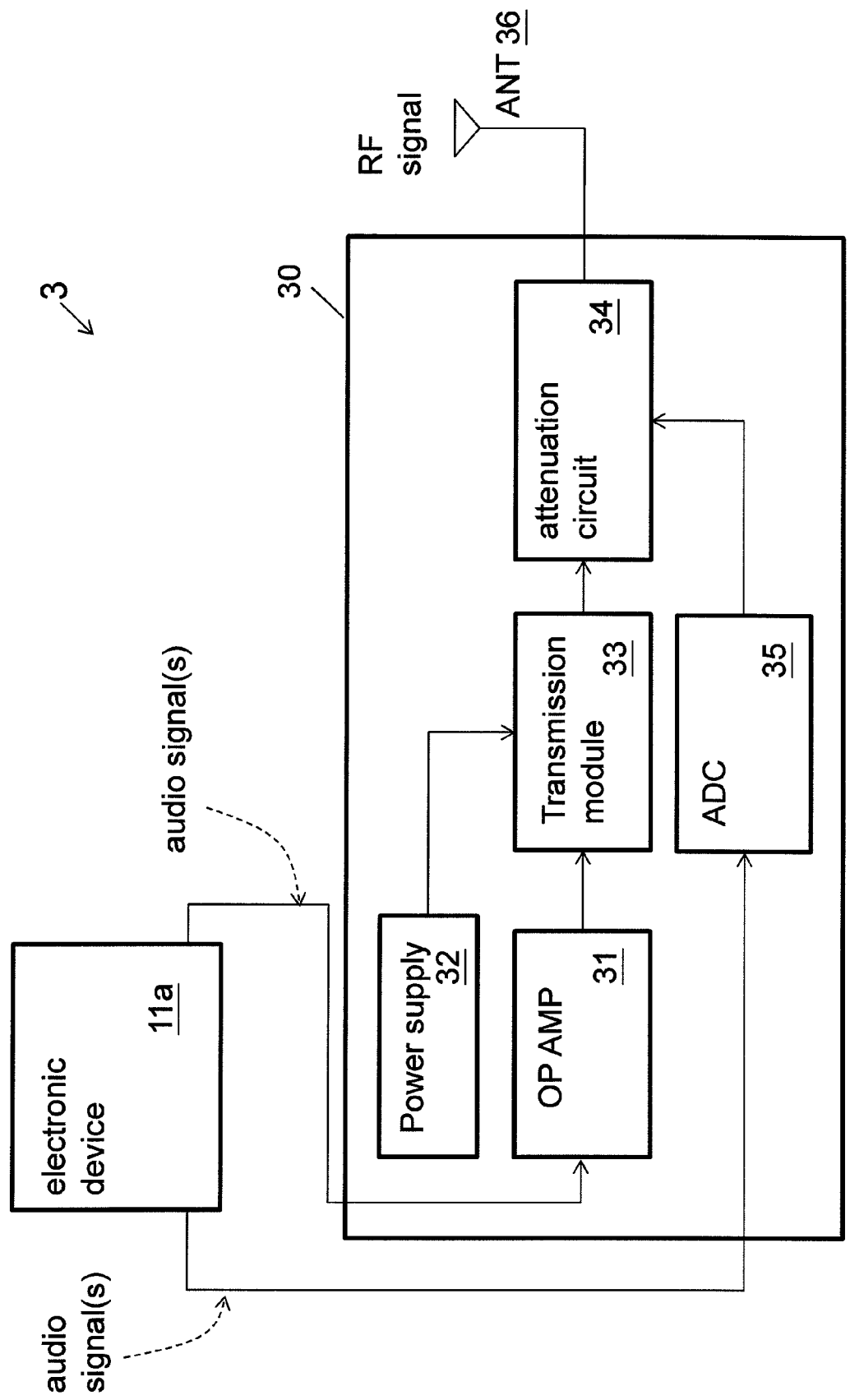
FIG. 2 is a block diagram of a transmitter of a remote control in accordance with an example of the present invention.

FIG. 2 is a block diagram of a transmitter 30 of a remote control 3 in accordance with an example of the present invention. Referring to FIG. 2, the remote control 3 may include an electronic device 11a and a transmitter 30, and the transmitter 30 may be connected to the electronic device 11a through an audio connector (not shown), such as a phone connector. The electronic device 11a may include a smart phone, a tablet computer, a laptop computer or the like. Furthermore, the transmitter 30 may include an operational amplifier (OP AMP) 31, a power supply 32, a transmission module 33, an attenuation circuit 34 and analog-to-digital converter (ADC) 35. The OP AMP 31, the transmission module 33 and the attenuation circuit 34 may be connected in series. The power supply 32 may provide power to the transmission module 33. The OP AMP 31 and the ADC 35 may be connected to the electronic device 11a via the audio connector as described above.

The OP AMP 31 may receive a left channel audio signal L from an electronic device 11a and amplify the left channel audio signal L. The transmission module 33 may then receive the amplified left channel audio signal L and generate a carrier signal. The amplified left channel audio signal L may be configured to modulate the carrier signal generated by the transmission module 33. In other words, the transmission module 33 may be configured to generate the carrier signal in accordance with the amplified left channel audio signal L. The carrier signal may contain the information of interests. The ADC 35 may receive a right channel audio signal R from the electronic device 11a and convert the right channel audio signal R to a digital signal which may serve as an activation signal. The activation signal may be used to activate the attenuation circuit 34 to attenuate the carrier signal generated by the transmission module 33. The attenuation circuit 34 may then generate an attenuated carrier signal. An antenna 36 may be configured to convert the attenuated carrier signal to an RF signal. The RF signal may then be transmitted via the antenna 36 to an external electronic device (not shown).

The transmission module 33 may need no extra modulator to modulate the carrier signal generated by the transmission module 33. The left channel audio signal L from the electronic device 11a, which may be received and amplified by the OP AMP 31, may be used to modulate the carrier signal generated by the transmission module 33. Furthermore, the right channel audio signal R from the electronic device 11a, which may be received and converted by the ADC 35, may be used to activate the attenuation circuit 34. In another example, the left channel audio signal L may be used to activate the attenuation circuit 34 and the right channel audio signal R may be used to modulate the carrier signal generated by the transmission module 33.

An application software which is installed or stored in the electronic device 11a may change signal pattern of each of the left channel audio signal L and right channel audio signal R. Signals L and R having pattern given by the application software may be used to cooperate with the transmitter 30. In other words, the application software in the electronic device may control the generation of the left channel audio signal L and right channel audio signal R.

When the activation signal from the ADC 35 is at a high voltage level, the attenuation circuit 34 is performed to attenuate the carrier signal. Therefore, the attenuation circuit 34 generates an attenuated carrier signal having a shorter transmitting distance of approximately 10 centimeter (cm). However, when the activation signal from the ADC 35 is at a low voltage level, the attenuation circuit 34 does not attenuate the carrier signal. Therefore, the attenuation circuit 34 bypasses the carrier signal to directly output the carrier signal having a transmitting distance of approximately 10 to 30 meters (m). In another example, when the activation signal from the ADC 35 is at a low voltage level, the attenuation circuit 34 is performed to attenuate the carrier signal.

Figure 3:
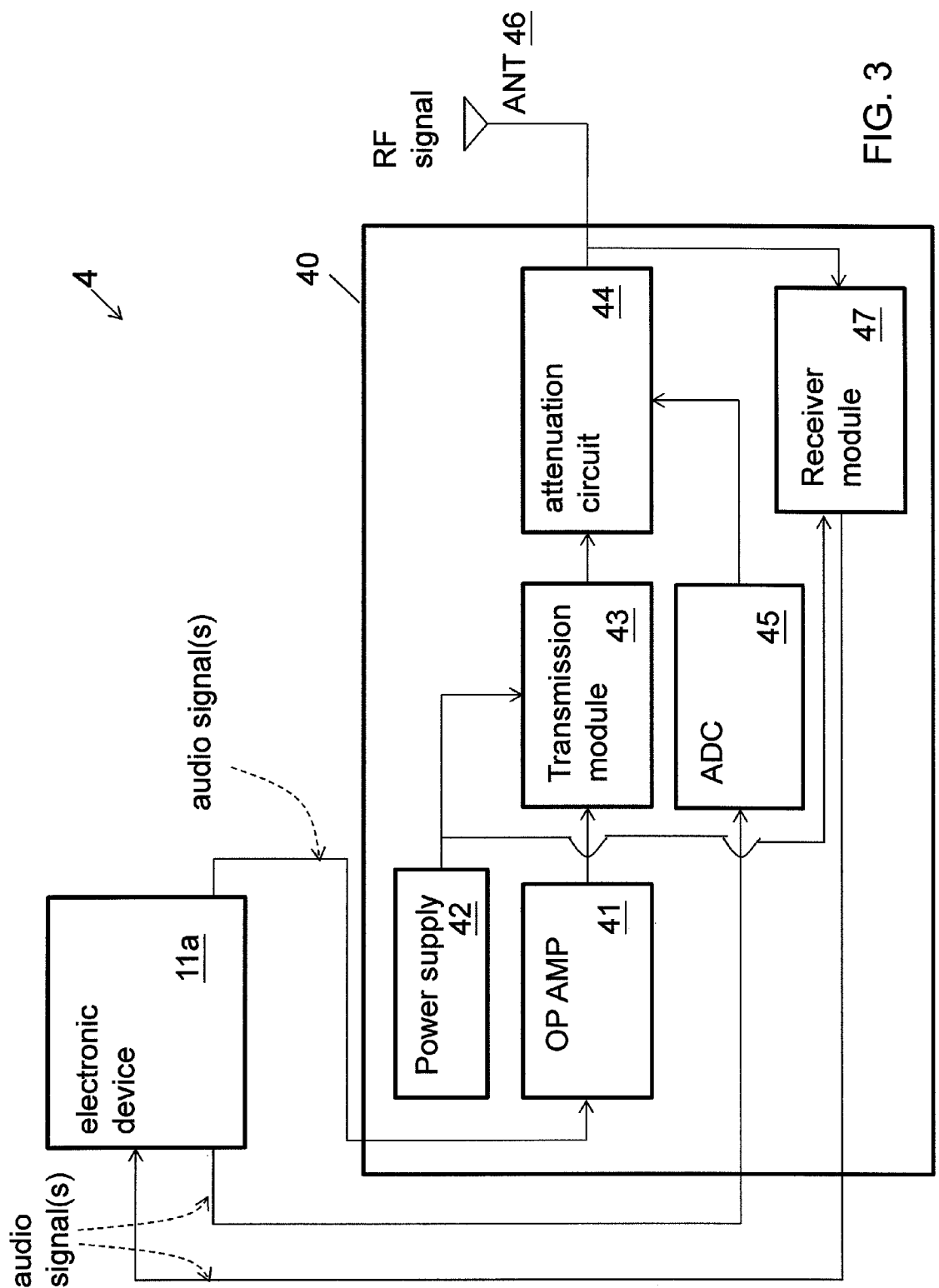
FIG. 3 is a block diagram of a transmitter of the remote control in accordance with another example of the present invention.

FIG. 3 is a block diagram of a transmitter 40 of a remote control 4 in accordance with another example of the present invention. Referring to FIG. 3, the transmitter 40 may be similar to the transmitter 30 as described and illustrated with reference to FIG. 2 except that, transmitter 40 may further include a receiver module 47 to receive a modulated carrier signal from an external electronic device (not shown). The transmission module 43 of the transmitter 40 may be similar to the transmission module 33 described and illustrated with reference to FIG. 2.

In the present example, The OP AMP 41 may receive a left channel audio signal L from an electronic device 11a and amplify the left channel audio signal L. The transmission module 43 may then receive the amplified left channel audio signal L and generate a carrier signal. The amplified left channel audio signal L may be configured to modulate the carrier signal generated by the transmission module 43. In other words, the transmission module 43 may be configured to generate the carrier signal in accordance with the amplified left channel audio signal L. The carrier signal may contain the information of interests. The ADC 45 may receive a right channel audio signal R from the electronic device 11a and convert the right channel audio signal R to a digital signal which may serve as an activation signal. The activation signal may be used to activate the attenuation circuit 44 to attenuate the carrier signal generated by the transmission module 43. The attenuation circuit 44 may then generate an attenuated carrier signal. An antenna 46 may be configured to convert the attenuated carrier signal to an RF signal. The RF signal may then be transmitted via the antenna 46 to an external electronic device (not shown).

The transmission module 43 may need no extra modulator to modulate the carrier signal generated by the transmission module 43. The left channel audio signal L from the electronic device 11a, which may be received and amplified by the OP AMP 41, may be used to modulate the carrier signal generated by the transmission module 43. Furthermore, the right channel audio signal R from the electronic device 11a, which may be received and converted by the ADC 45, may be used to activate the attenuation circuit 44. In another example, the left channel audio signal L may be used to activate the attenuation circuit 44 and the right channel audio signal R may be used to modulate the carrier signal generated by the transmission module 43.

The receiver module 47 may be configured to receive an RF signal from an external electronic device (not shown) via the antenna 46. The RF signal received by the receiver module 47 may then be converted to an audio signal, such as a microphone (MIC) channel audio signal. The received RF signal by the receiver module 47 may contain information, such as an identification code (ID code), to verify the external electronic device and establish a communication channel between the remote control 4 and the external electronic device. The electronic device 11a may then receive the audio signal via the aforesaid audio connector and process the audio signal to retrieve the ID code.

In another example of the present invention, the left channel audio signal L and the right channel audio signal R may be switched. In other words, the right channel audio signal R may be received and amplified by OP AMP 41 to serve as the amplified audio signal to modulate the carrier signal generated by the transmission module 43.

An application software which is installed or stored in the electronic device 11a may change signal pattern of each of the left channel audio signal L and right channel audio signal R. Signals L and R having pattern given by the application software may be used to cooperate with the transmitter 40. In other words, the application software in the electronic device may control the generation of the left channel audio signal L and right channel audio signal R. Furthermore, the application software may be used to process the audio signal to acquire the ID code and store the ID code in the electronic device 11a.

It will be appreciated by those skilled in the art that changes could be made to the examples described above without departing from the broad inventive concept thereof. It is understood, therefore, that this invention is not limited to the particular examples disclosed, but it is intended to cover modifications within the spirit and scope of the present invention as defined by the appended claims.

Further, in describing representative examples of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

I claim:

1. A transmitter for remote control, the transmitter comprising:
    an amplifier configured to receive a first audio signal from an electronic device and amplify the first audio signal;
    a transmission module electrically connected to the amplifier to receive the amplified first audio signal and generate a carrier signal;
    a power supply connected to the transmission module; and
    an attenuation circuit electrically connected to the transmission module to receive the carrier signal,
    wherein the amplified first audio signal is configured to modulate the carrier signal and the first audio signal is one of a left channel audio signal and a right channel audio signal output from the electronic device through an audio connector, and
    wherein the attenuation circuit attenuates the carrier signal when the attenuation circuit is activated by a high voltage level and a low voltage level.

2. The transmitter of claim 1 further comprising an analog-to-digital converter connected to the attenuation circuit.

3. The transmitter of claim 2, wherein the analog-to-digital converter is configured to receive a second audio signal from the electronic device and generate an activation signal to activate the attenuation circuit.

4. The transmitter of claim 3, wherein the second audio signal is one of the left channel audio signal and the right channel audio signal other than the first audio signal.

5. The transmitter of claim 3, wherein an application software in the electronic device controls the generation of the first audio signal and the second audio signal.

6. The transmitter of claim 3, wherein the attenuation circuit attenuates the carrier signal when the activation signal is at a high voltage level.

7. The transmitter of claim 3, wherein the attenuation circuit attenuates the carrier signal when the activation signal is at a low voltage level.

8. A transmitter for remote control, the transmitter comprising:
    an amplifier configured to receive a first audio signal from an electronic device and amplify the first audio signal;
    a transmission module electrically connected to the amplifier to receive the amplified first audio signal and generate a carrier signal;
    a power supply connected to the transmission module;
    an attenuation circuit electrically connected to the transmission module to receive the carrier signal and output an attenuated carrier signal; and
    an analog-to-digital converter connected to the attenuation circuit,
    wherein the amplified first audio signal is configured to modulate the carrier signal, and the analog-to-digital converter is configured to receive a second audio signal from the electronic device and generate an digital signal to activate the attenuation circuit, and
    wherein the attenuation circuit attenuates the carrier signal when the attenuation circuit is activated by a high voltage level and a low voltage level.

9. The transmitter of claim 8, wherein the first audio signal is one of a left channel audio signal and a right channel audio signal output from the electronic device via an audio connector, and the second audio signal is one of the left channel audio signal and the right channel audio signal other than the first audio signal.

10. The transmitter of claim 8, wherein an application software in the electronic device controls the generation of the first audio signal and the second audio signal.

11. The transmitter of claim 8, wherein the attenuation circuit attenuates the carrier signal when the digital signal is at a high voltage level.

12. The transmitter of claim 8, wherein the attenuation circuit attenuates the carrier signal when the digital signal is at a low voltage level.

13. A transmitter for remote control, the transmitter comprising:
    an amplifier configured to receive a first audio signal from a first electronic device and amplify the first audio signal;
    a transmission module electrically connected to the amplifier to receive the amplified first audio signal and generate a carrier signal;
    an attenuation circuit electrically connected to the transmission module to receive the carrier signal and output an attenuated carrier signal;
    a receiver module electrically connected to the first electronic device; and
    a power supply respectively connected to the transmission module and the receiver module,
    wherein the amplified first audio signal is configured to modulate the carrier signal, and
    wherein the attenuation circuit attenuates the carrier signal when the attenuation circuit is activated by a high voltage level and a low voltage level.

14. The transmitter of claim 13, wherein the receiver module receives a first signal via an antenna, the first signal contains identification information for a second electronic device.

15. The transmitter of claim 14, wherein the first electronic device is different from the second electronic device.

16. The transmitter of claim 14, wherein the first signal is sent to the first electronic device and the first electronic device is configured to retrieve the identification information of the first signal.

17. The transmitter of claim 13 further comprising an analog-to-digital converter connected between the first electronic device and the attenuation circuit.

18. The transmitter of claim 17, wherein the analog-to-digital converter is configured to receive a second audio signal from the first electronic device and convert the second audio signal to a digital signal.

19. The transmitter of claim 18, wherein the digital signal controls the attenuation circuit.

20. The transmitter of claim 18, wherein the first audio signal is one of a left channel audio signal and a right channel audio signal from the electronic device, and the second audio signal is one of the left channel audio signal and the right channel audio signal other than the first audio signal.

* * * * *